July 3, 1945.  J. E. YOUNG  2,379,775
POWER TAKE-OFF
Filed June 2, 1944  3 Sheets-Sheet 1
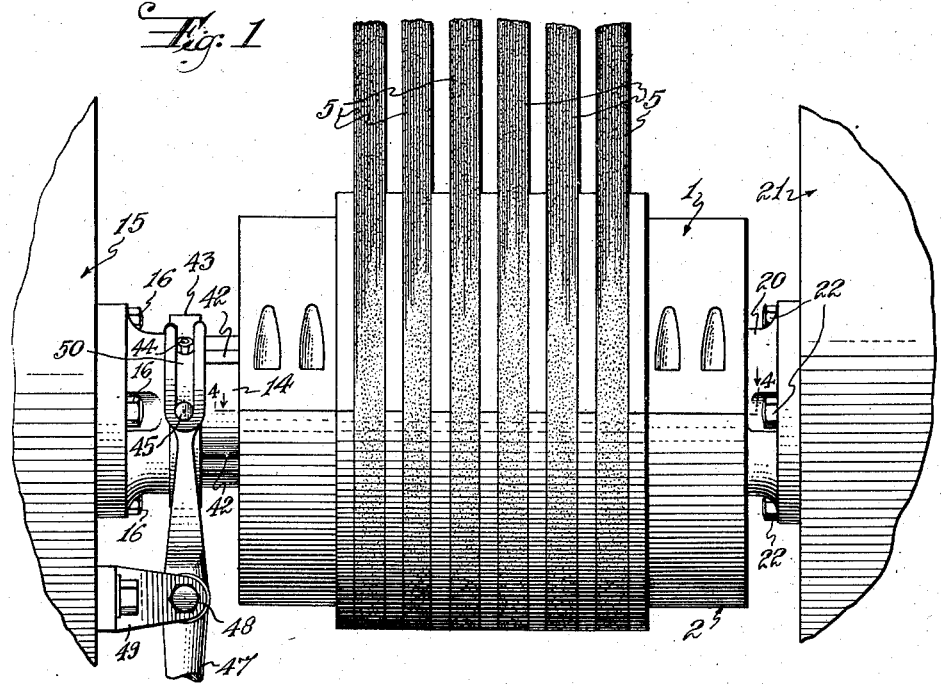
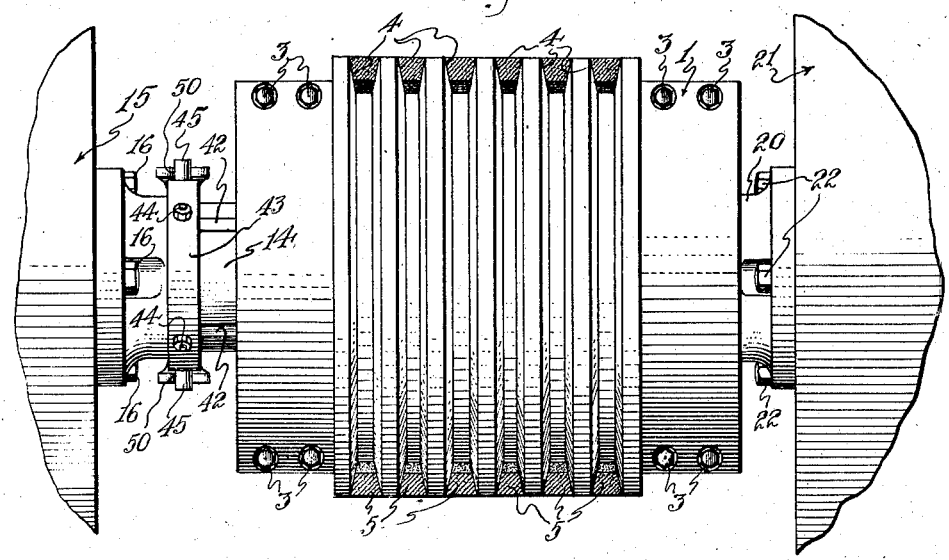
INVENTOR.
Joseph E. Young
BY A. D. T. Libby
Attorney.

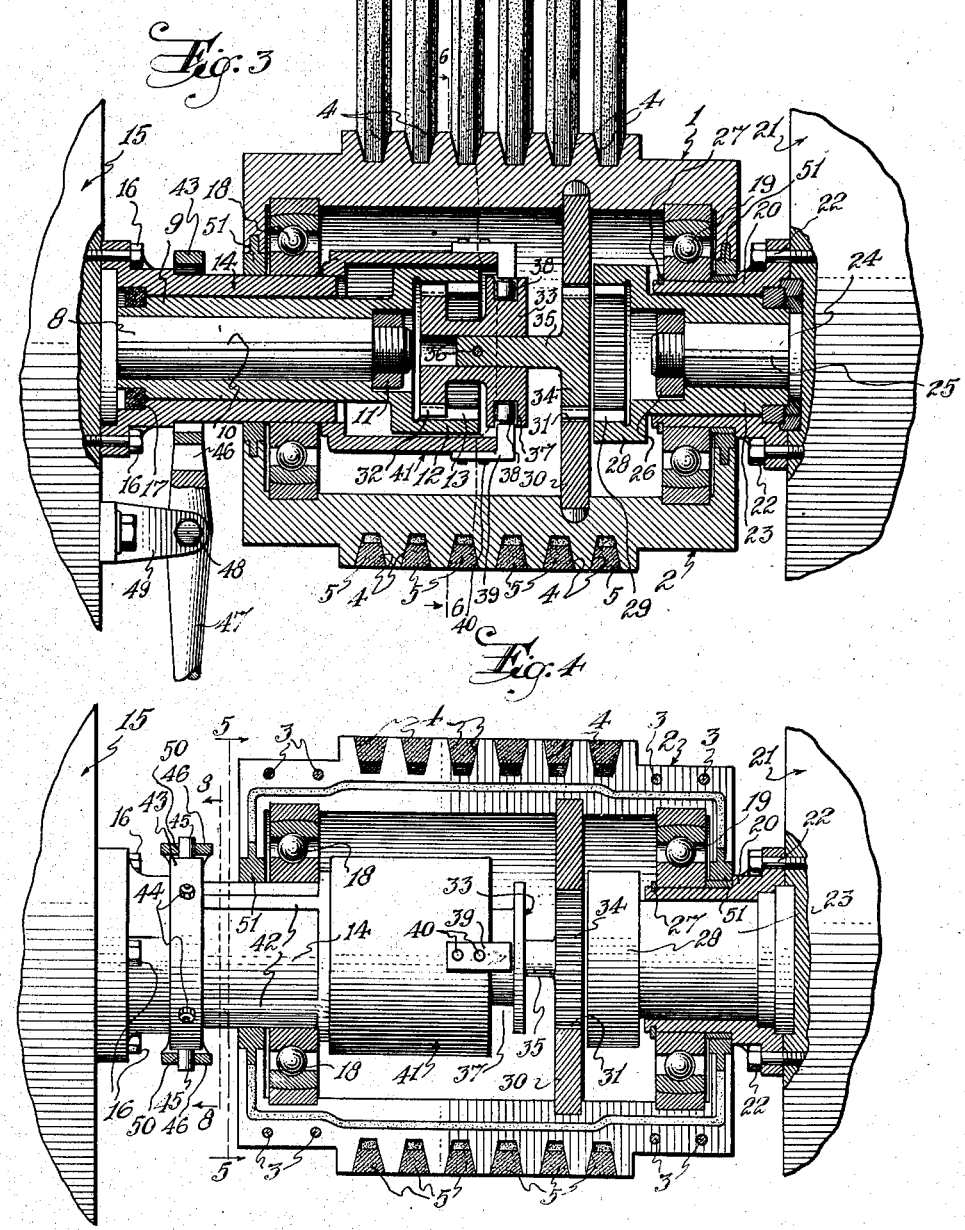

July 3, 1945.     J. E. YOUNG     2,379,775
POWER TAKE-OFF
Filed June 2, 1944     3 Sheets-Sheet 3
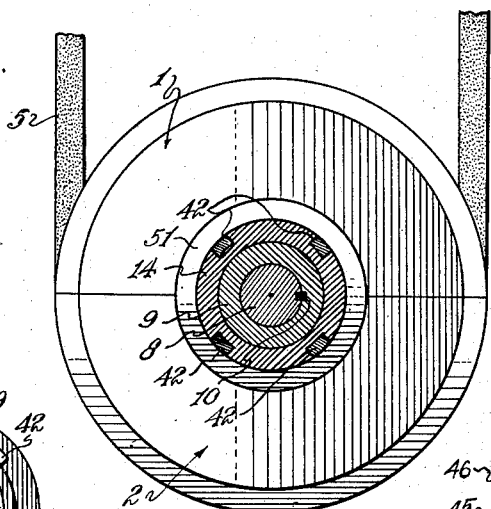
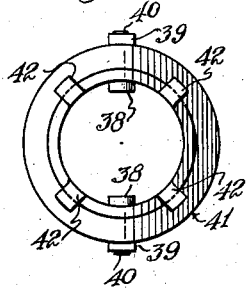
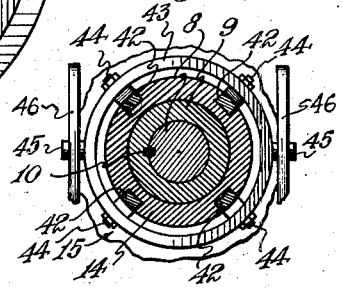
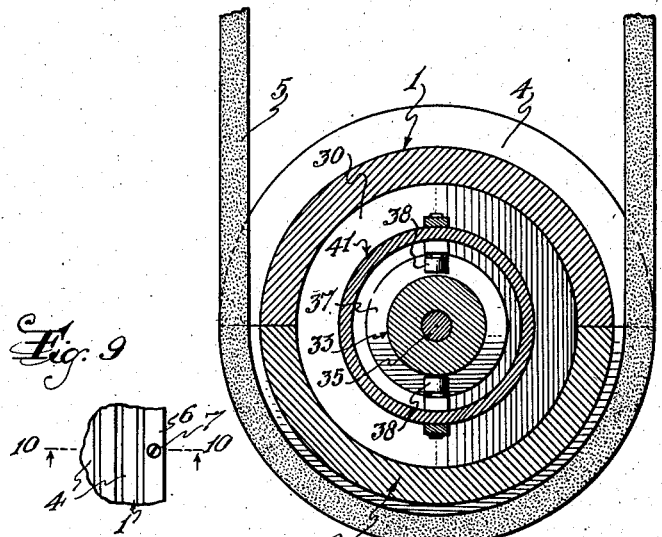
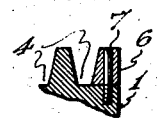
INVENTOR.
Joseph E. Young
BY A. D. T. Libby
Attorney.

Patented July 3, 1945

2,379,775

UNITED STATES PATENT OFFICE 2,379,775

POWER TAKE-OFF

Joseph Eng Young, Newark, N. J., assignor to Couse Laboratories, Newark, N. J., a copartnership composed of Kibbey W. Couse and Murray Thompson Application June 2, 1944, Serial No. 538,379

10 Claims. (Cl. 74—11)

This invention relates to a power take-off particularly adapted for use on traveling machine shops and allied structures which are designed especially for use by an army.

On these types of structures, there are numerous machine shop tools, such as drill presses, lathes, milling machines, grinders, shapers, air compressors, welding machines and other apparatus necessary to make repairs in the field on aeroplanes, tanks, trucks, automobiles and other war equipment and farm machinery. This machinery equipment requires a rotary drive from the engine which propels the vehicle. While power take-off devices have been heretofore proposed and used, my present invention is directed to a simplification and improvement of prior-art structures.

It is therefore the principal object of my invention to provide a relatively simple and effective power take-off from the vehicle engine to the machine tools carried by the vehicle.

Other ancillary objects will be clear to one skilled in this type of equipment from a reading of the following specification, taken in connection with the annexed drawings, wherein:

Figure 1 is a side elevation of the apparatus.

Figure 2 is a top plan view of Figure 1.

Figure 3 is a vertical, longitudinal section through the structure.

Figure 4 is a horizontal, longitudinal section on the line 4—4 of Figure 1 at the split in the casing.

Figure 5 is a view on the line 5—5 of Figure 4.

Figure 6 is a view on the line 6—6 of Figure 3.

Figure 7 is a view of the driving shifting sleeve per se, looking from left to right of Figure 4.

Figure 8 is a view on the line 8—8 of Figure 4.

Figure 9 is a fragmentary plan view of a portion of the take-off housing.

Figure 10 is a view on the line 10—10 of Figure 9.

Referring now to the details, wherein like numbers refer to corresponding parts, 1 and 2 are the top and bottom portions of the housing which are fastened together by a plurality of studs or bolts 3. The outer surface of the housing is provided with a plurality of V-shaped grooves 4, within which driving belt members 5 are positioned. As shown in Figure 10, the outer annular flange 6 is separable from the housing and fastened thereto by a plurality of screws 7. As a matter of fact, the other flanges may be of the separable type and fastened to the parts of the casing as these parts are assembled.

Entering the casing from one end, is a driving shaft 8 drivingly carrying a sleeve 9, the drive connection being provided by a key 10 and nut 11. The inner end of the driving sleeve 9 terminates in a preferably enlarged rim portion 12, the inner periphery of which has gear teeth 13. The sleeve 9 is carried in a member 14 fastened to a bearing plate 15 in any satisfactory manner as by screw-studs 16. A packing 17 may be used as indicated. A ball bearing 18 carries one end of the housing on the member 14.

A somewhat similar construction is used at the driven end of the housing. A ball bearing 19 is positioned between the housing and the bearing member 20 fastened to a support member 21 by means of screw-studs 22. Positioned within the member 20, is a driven sleeve 23 fastened to a driven shaft 24 by a key 25 and nut 26. The inner race of the bearing 19 is held to the member 20 by a lock ring 27. The inner end of the sleeve 23 is preferably enlarged and terminates in a rim 28 having internal gear teeth 29 cut therein. To the inner periphery of the housing is fastened a hollow annular ring 30 having gear teeth 31 in alignment with the gear teeth 29 on the sleeve 23. Positioned between the driving sleeve 9 and the driven sleeve 23, is a gear combination comprising a gear 32 having a spaced disc-shaped member 33 integral therewith. A gear 34 has a stem 35 projecting through the disc 33 and is fastened to the gear-and-disc structure in any satisfactory manner as by a pin 36. By this construction, whenever the gear 32 and disc 33 are shifted, the gear 34 moves with them.

The outer peripheral surface of the disc 33 is provided with an annular groove 37. Positioned within this annular groove are a plurality of antifriction members in the form of rollers 38 carried on the inwardly projecting ends of L-shaped members 39 which are fastened, as by screws 40, to a hollow circular or cup-shaped member 41 that encompasses the rim portion 12 of the driving sleeve 9.

The member 41 has a plurality of projecting arms 42, four being indicated in Figure 8. These arms extend through shallow slots in the outer surface of the member 14. Oil and dirt seals 51 are used at both ends of the casing. The seal 51 at the driving end engages the arms 42, thereby preventing oil from the interior of the casing escaping via the arms as the shifting operations are performed. To the arms 42 is fastened a shift ring or collar 43 in any satisfactory manner as by screw-studs 44. The shift ring or collar 43 has a pair of oppositely disposed studs 45 positioned in holes or slots 50 in the ends of upwardly extending arms 46 formed on the end of a lever 47 pivoted at 48 to a bracket 49 fastened to the support member 15.

In the operation of the structure just described, it will be noted that the gear 32 is in mesh with the gear teeth 13 on the rim 12 of the driving sleeve 9, and that the gear 34 is in mesh with the gear teeth of the member 30 carried by the housing. Since the shaft 8 is driven from the engine, preferably by way of the transmission, power is conveyed to the housing and to the belt drive 5 and through suitable interconnecting structures with the various machines. When the lever 47 is moved to the left, the member 41 shifts the gear combination described, so that the gear 34 engages the gear teeth on the driven sleeve 23. Since this latter sleeve is connected to the driven shaft 24, power is conveyed back to the differential of the vehicle and the vehicle is driven according to the controls of the transmission.

When it is desired to operate the machinery carried by the truck, the lever 47 is moved to the right and the gears are shifted into the position shown in Figure 3 and as already described.

Certain changes may be made in the details without departing from the spirit of my invention or the scope of the appended claims; for example, in place of the member 41 having projecting arms 42, tubes may be passed through cooperating openings in the member 14, through which tubes fluid may be passed to coact with hydraulic means associated with the member 41.

What I claim is:

1. A power take-off structure including a cylindrical casting rotatably mounted at opposite ends on suitable supports, the casing being adapted to receive power-transmitting means on its exterior surface and having internally positioned clutch teeth, a driving shaft entering the casing at one end, a driven shaft entering the casing at the opposite ends and both shafts terminating within the casing, sleeves drivingly carried on each of said shafts and having annular rim portions with internal clutch teeth thereon, a gear type clutch positioned within the rim of the sleeve carried by the driving shaft and continually in mesh with the internal clutch teeth on said rim, the gear type clutch having an extension terminating outside the rim, the extension having an annular groove, a hollow circular member positioned around the said driving sleeve rim and having projecting parts carrying anti-friction members in said groove, and also having projecting arms extending through the casing longitudinally of the driving shaft and its sleeve, a collar fastened to said arms with means for engaging the collar to slide it and connected parts longitudinally of the shaft, a gear type clutch having a stem fastened to said first gear type clutch and adapted to be longitudinally moved by similar movement of the first gear type clutch into mesh with the housing clutch teeth or the clutch teeth on the rim of the sleeve carried by the driven shaft.

2. A power take-off structure including a cylindrical casing rotatably mounted at opposite ends on suitable supports, the casing being adapted to receive power-transmitting means on its exterior surface and having internally positioned clutch teeth, a driving shaft entering the casing at one end, a driven shaft entering the casing at the opposite ends and both shafts terminating within the casing, sleeves drivingly carried on each of said shafts and terminating in circular rim portions projecting toward each other, with internal clutch teeth thereon, a gear type clutch positioned within the circular rim of the driving sleeve and in mesh with the clutch teeth thereon, a circular disc fastened to said gear type clutch but spaced therefrom and having an annular groove, a hollow circular member positioned around said driving sleeve rim, with parts extending downwardly and carrying anti-friction members in said groove, and also having arms extending without the drive end of the casing, a collar fastened to said arms with means for engaging the collar to slide it and connected parts longitudinally of the said shafts, a gear type clutch fastened in spaced relation to the first gear type clutch and longitudinally moved when the first gear type clutch is so moved, whereby the second gear type clutch is caused to mesh with either the clutch teeth on the housing or the internal clutch teeth on the driven sleeve.

3. A power take-off structure as set forth in claim 2, further characterized in that said circular disc is integral with its gear type clutch and is located closely adjacent the end of said driving sleeve rim, while the second gear type clutch has a stem extending through said disc toward the first gear type clutch and is fastened to the joint structure of the first gear type clutch and the disc.

4. A power take-off structure including a cylindrical casing rotatably mounted at opposite ends on suitable supports, the casing being adapted to receive power-transmitting means on its exterior surface and having internally positioned clutch teeth, a driving shaft carrying and driving a sleeve and both entering the casing at one end, a driven shaft carrying and turning a sleeve and both entering the casing at its opposite end, each sleeve terminating in annular rim portions with internal clutch teeth thereon, a gear type clutch combination comprising a a pair of inter-connected gears of the clutching type arranged in longitudinally spaced relation, one gear type clutch being continually in mesh with the clutch teeth on the driving sleeve, while the other gear type clutch is positioned so as to be moved into mesh with the clutch teeth on the casing, or with the clutch teeth on the driven sleeve, shifting means to shift said gear type clutch combination longitudinally, said means having parts within the casing to engage the gear type clutch combination, and parts extending without the casing with parts for acting thereon to move said shifting means.

5. A power take-off structure as set forth in claim 4, further characterized in that the gear type clutch combination includes a disc-like member located between said pair of gears of the clutching type and having a peripheral annular groove, while the shifting means includes a cup-shaped member positioned over the rim portion of the driving sleeve and L-shaped parts, one arm of each carrying an anti-friction member in said groove, the cup-shaped member having arms projecting without the casing, with a collar fastened to said arms, with means for engaging and moving said collar to move the cup-shaped member and gear type clutch combination.

6. A power take-off structure including a cylindrical casing rotatably mounted at opposite ends on suitable supports, the casing being adapted to receive power-transmitting means on its exterior surface and having internally positioned clutch teeth, at least a driving sleeve entering the casing at one end and terminating in an annular rim with internal clutch teeth thereon, at least a driven sleeve entering the casing from the opposite end and terminating in an annular rim with internal clutch teeth thereon, a gear type clutch combination comprising a pair of inter-connected gears of the clutching type, one of which is continually in mesh with the clutch teeth on the driving sleeve, while the other is adapted to engage either the clutch teeth on the casing or the driven sleeve, means positioned at least around the driving sleeve inner end and having parts for engaging the gear type clutch combination to shift the same, said means also having parts extending outside the casing and exteriorly of the sleeve, and means for engaging said latter parts for producing said shift.

7. A power take-off structure including a cylindrical casing rotatably mounted at opposite ends on suitable supports, the casing being adapted to receive power-transmitting means on its exterior surface and having internally positioned clutch teeth, at least a driving sleeve and a driven sleeve entering the casing from opposite ends and each having clutch teeth thereon, a gear type clutch combination comprising a pair of tandemly arranged gears of the clutching type with a shifting disc located between the gears of the clutching type, one clutch being permanently in mesh with the clutch teeth on the driving sleeve, while the other clutch is adapted to mesh with either the clutch teeth on the casing or those on the driven sleeve, a shifting structure having parts to anti-frictionally engage said shifting disc and other parts extending without the casing, and means for engaging said latter parts to slidably shift said structure and the gear type clutch combination.

8. A power take-off structure as set forth in claim 7, further characterized in that the shifting disc has an annular peripheral groove, while said shifting structure includes a cup-shaped member encompassing the inner end of the driving sleeve.

9. A power take-off structure as set forth in claim 7, further characterized in that the outer surface of the casing is provided with a plurality of annular removable rings whose section simulates in shape the frustum of one side of a pyramid, whereby a V-belt may be used for the transmission of power.

10. A power take-off structure including a cylindrical casing rotatably mounted at opposite ends on suitable supports, the casing being adapted to receive power-transmitting means on its exterior surface and having internally positioned clutch teeth, at least a driving sleeve entering the casing at one end and terminating in an annular rim with internal clutch teeth thereon, at least a driven sleeve entering the casing from the opposite end and terminating in an annular rim with internal clutch teeth thereon, a gear type clutch combination comprising a pair of inter-connected gears of the clutching type, one of which is continually in mesh with the clutch teeth on the driving sleeve, while the other is adapted to engage either the clutch teeth on the casing or the driven sleeve, means positioned at least around the driving sleeve inner end and having parts for engaging the gear type clutch combination to shift the same, and means extending into the casing from its exterior for acting on said positioned means for moving said means for producing said shift.

JOSEPH ENG YOUNG.